(12) United States Patent
Bonham et al.

(10) Patent No.: US 9,524,315 B1
(45) Date of Patent: Dec. 20, 2016

(54) DATE UPDATING IN SUPPORT OF DATA ANALYSIS

(71) Applicant: SAS Institute Inc., Cary, NC (US)

(72) Inventors: Robert N. Bonham, Raleigh, NC (US); Steven C. Holzworth, Cary, NC (US); Keefe Hayes, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/222,329

(22) Filed: Jul. 28, 2016

Related U.S. Application Data (60) Provisional application No. 62/315,926, filed on Mar. 31, 2016.

(51) Int. Cl.
  *G06F 11/00* (2006.01)
  *G06F 17/30* (2006.01)

(52) U.S. Cl.
  CPC ............... *G06F 17/30377* (2013.01)

(58) Field of Classification Search
  CPC .................................. G06F 17/30377
  See application file for complete search history.

(56) References Cited

U.S. PATENT DOCUMENTS

| | | | |
|---|---|---|---|
| 7,134,020 B2 | 11/2006 | Eagle et al. | |
| 9,015,536 B1* | 4/2015 | Ricken | G06F 11/0709 714/47.2 |
| 9,122,795 B1 | 9/2015 | Daudel et al. | |
| 2012/0158089 A1* | 6/2012 | Bocek | A61N 1/37 607/28 |
| 2016/0092516 A1* | 3/2016 | Poola | G06F 17/30377 707/776 |

FOREIGN PATENT DOCUMENTS

| | | |
|---|---|---|
| CN | 104933077 | 9/2015 |
| WO | WO2015125041 | 8/2015 |

OTHER PUBLICATIONS

Kornel Chromiński and Magdalena Tkacz, *Comparison of Outlier Detection Methods in Biomedical Data*, Journal of Medical Informatics & Technologies, vol. 16, 2010.

(Continued)

*Primary Examiner* — Joshua P Lottich
(74) *Attorney, Agent, or Firm* — Bell & Manning, LLC (57) ABSTRACT

A computing device updates date values in a read dataset to support data analytics. Outlier and non-outlier date values are identified by, for each date value as a respective date value, reading a predefined number of neighboring date values relative to the respective date value; computing a median value and a median absolute deviation value of the predefined number of neighboring date values; computing a difference between the respective date value and the median value; dividing an absolute value of the difference by the median absolute deviation value to define a deviation value; comparing the deviation value to a threshold deviation value; and, based on the comparison, identifying the respective date value as an outlier or a non-outlier date value. Each identified non-outlier date value is updated with a new date computed using a date offset value. Each updated, identified non-outlier date value is replaced in a date updated dataset.

30 Claims, 7 Drawing Sheets

(56) References Cited

OTHER PUBLICATIONS

Hampel, printed from http://www.mathworks.com/help/signal/ref/hampel.html?requestedDomain=www.mathworks.com&requestedDomain=www.mathworks.com on Jul. 12, 2016, The MathWorks, Inc.
Splunk® IT Service Intelligence 2.2.0 User Manual, Apr. 11, 2016.
Logstash Introduction, https://www.elastic.co/guide/en/logstash/current/introduction.html, Apr. 14, 2016.
Liu et al., On-line outlier detection and data cleaning, Computers and Chemical Engineering 28, Mar. 21, 2004, pp. 1635-1647.
Ben-Gal I., *Outlier detection*, In: Maimon O. and Rockach L. (Eds.) Data Mining and Knowledge Discovery Handbook: A Complete Guide for Practitioners and Researchers, Kluwer Academic Publishers, 2005.

* cited by examiner

DATE UPDATING IN SUPPORT OF DATA ANALYSIS

CROSS-REFERENCE TO RELATED APPLICATIONS

The present application claims the benefit of 35 U.S.C. §119(e) to U.S. Provisional Patent Application No. 62/315, 926 filed on Mar. 31, 2016, the entire contents of which is hereby incorporated by reference.

BACKGROUND

Computer operating systems, utilities, and various types of applications issue messages to monitor activity such as errors encountered during operation, to identify changes of state such as service levels being reduced, to audit information such as attempts and/or failures to authenticate to an application or service, etc. The messages may be written to a file and/or sent to an event logging service.

The messages can be collected and analyzed to determine trends in activity, to issue alerts when anomalous events occur such as failed attempts to authenticate to a "privileged" account or when errors occur in processing, to audit usage of software and other needs, etc. These types of analyses depend on reading and processing the messages using, for example, a data analytics application and producing reports with a consistent behavior, format, content, and efficacy. Monitoring tools that track message content to produce alerts on anomalous events have similar requirements.

SUMMARY

In another example embodiment, a non-transitory computer-readable medium is provided having stored thereon computer-readable instructions that, when executed by a computing device, cause the computing device to update dataset dates in support of data analytics. A dataset is read. Date values are identified in the read dataset. Outlier and non-outlier date values included in the identified date values are identified by, for each date value of the identified date values as a respective date value, reading a predefined number of neighboring date values relative to the respective date value; computing a median value and a median absolute deviation value of the read predefined number of neighboring date values; computing a difference between the respective date value and the computed median value; dividing an absolute value of the computed difference by the computed median absolute deviation value to define a deviation value of the respective date value; comparing the defined deviation value to a threshold deviation value; and based on the comparison, identifying the respective date value as either an outlier date value or a non-outlier date value. A date offset value is determined. Each identified non-outlier date value read from the dataset is updated with a new date computed using the determined date offset value. The read dataset is stored to a date updated dataset by replacing each identified non-outlier date value with a corresponding updated date value.

In yet another example embodiment, a computing device is provided. The system includes, but is not limited to, a processor and a non-transitory computer-readable medium operably coupled to the processor. The computer-readable medium has instructions stored thereon that, when executed by the computing device, cause the computing device to update dataset dates in support of data analytics.

In an example embodiment, a method of updating dataset dates in support of data analytics is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
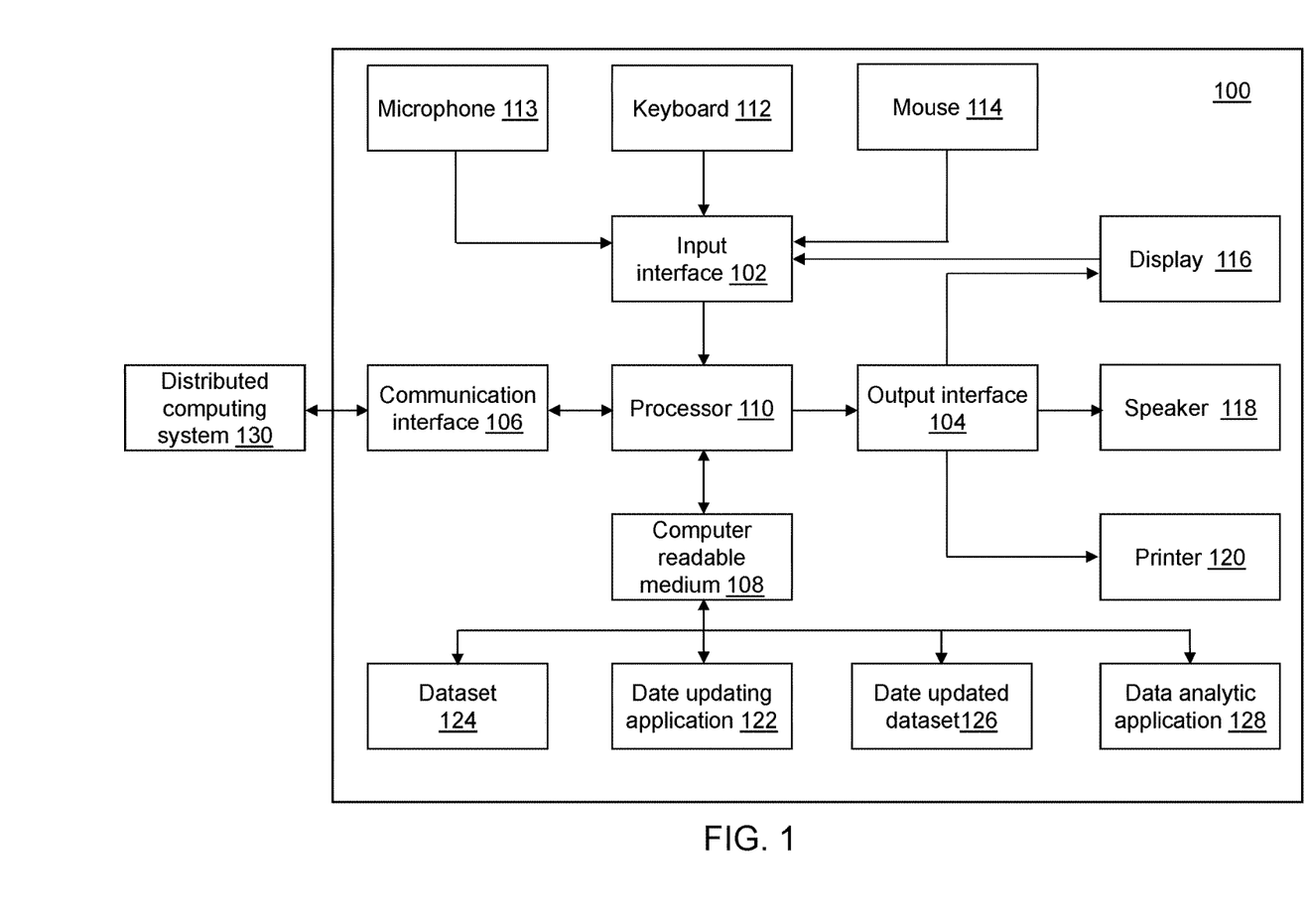
FIG. 1 depicts a block diagram of a date updating device in accordance with an illustrative embodiment.

Referring to FIG. 1, a block diagram of a date updating device 100 is shown in accordance with an illustrative embodiment. Date updating device 100 may include an input interface 102, an output interface 104, a communication interface 106, a non-transitory computer-readable medium 108, a processor 110, a date updating application 122, a dataset 124, a date updated dataset 126, and a data analytic application 128. Fewer, different, and/or additional components may be incorporated into date updating device 100.

Input interface 102 provides an interface for receiving information from the user or another device for entry into date updating device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into date updating device 100 or to make selections presented in a user interface displayed on display 116. The same interface may support both input interface 102 and output interface 104. For example, display 116 comprising a touch screen provides a mechanism for user input and for presentation of output to the user. Date updating device 100 may have one or more input interfaces that use the same or a different input interface technology. The input interface technology further may be accessible by date updating device 100 through communication interface 106.

Output interface 104 provides an interface for outputting information for review by a user of date updating device 100 and/or for use by another application or device. For example, output interface 104 may interface with various output technologies including, but not limited to, display 116, a speaker 118, a printer 120, etc. Date updating device 100 may have one or more output interfaces that use the same or a different output interface technology. The output interface technology further may be accessible by date updating device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Date updating device 100 may have one or more communication interfaces that use the same or a different communication interface technology. For example, date updating device 100 may support communication using an Ethernet port, a Bluetooth antenna, a telephone jack, a USB port, etc. Data and messages may be transferred between date updating device 100 and distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Date updating device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Date updating device 100 also may have one or more drives that support the loading of a memory media such as a CD, DVD, an external hard drive, etc. One or more external hard drives further may be connected to date updating device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Date updating device 100 may include a plurality of processors that use the same or a different processing technology.

Date updating application 122 performs operations associated with creating date updated dataset 126 from data stored in dataset 124. Date updated dataset 126 may be used to support various data analysis functions provided by data analytic application 128. Some or all of the operations described herein may be embodied in date updating application 122. The operations may be implemented using hardware, firmware, software, or any combination of these methods.

Referring to the example embodiment of FIG. 1, date updating application 122 is implemented in software (comprised of computer-readable and/or computer-executable instructions) stored in computer-readable medium 108 and accessible by processor 110 for execution of the instructions that embody the operations of date updating application 122. Date updating application 122 may be written using one or more programming languages, assembly languages, scripting languages, etc. Date updating application 122 may be integrated with analytic tools such as data analytic application 128. For example, date updating application 122 may be part of one or more SAS software tools such as Base SAS, SAS® Enterprise Miner™ SAS/STAT®, SAS® High Performance Analytics Server, SAS® LASR™, SAS® Embedded Process, the SAS® Scoring Accelerator software tool, SAS® In-Database Products, SAS®/CONNECT, SAS® Scalable Performance Data Engine, SAS® Metadata, SAS® DS2 Language, SAS® Visual Analytics, all of which are developed and provided by SAS Institute Inc. of Cary, N.C., USA.

Date updating application 122 may be implemented as a Web application. For example, date updating application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data analytic application 128 performs operations associated with data processing and/or analysis of a dataset including date updated dataset 126. Merely for illustration, data analytic application 128 may be implemented using or integrated with one or more SAS software tools such as Base SAS, SAS® Enterprise Miner™ SAS/STAT®, SAS® High Performance Analytics Server, SAS® LASR™, SAS® Embedded Process, the SAS® Scoring Accelerator software tool, SAS® In-Database Products, SAS®/CONNECT, SAS® Scalable Performance Data Engine, SAS® Metadata, SAS® DS2 Language, SAS® Visual Analytics, all of which are developed and provided by SAS Institute Inc. of Cary, N.C., USA. Some or all of the operations described herein may be embodied in data analytic application 128. The operations may be implemented using hardware, firmware, software, or any combination of these methods.

Referring to the example embodiment of FIG. 1, data analytic application 128 is implemented in software (comprised of computer-readable and/or computer-executable instructions) stored in computer-readable medium 108 and accessible by processor 110 for execution of the instructions that embody the operations of data analytic application 128. Data analytic application 128 may be written using one or more programming languages, assembly languages, scripting languages, etc. Data analytic application 128 further may be stored and executed on one or more devices of distributed computing system 130 instead of, or in addition to, storage and execution on date updating device 100. Data analytic application 128 may be implemented as a Web application.

The data stored in dataset 124 may be generated by and/or captured from a variety of sources including one or more sensors of the same or different type, one or more computing devices, etc. The data stored in dataset 124 may be received directly or indirectly from the source and may or may not be pre-processed in some manner. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Dataset 124 may be stored on computer-readable medium 108 or on one or more computer-readable media of distributed computing system 130 and accessed by date updating device 100 using communication interface 106, input interface 102, and/or output interface 104. Data stored in dataset 124 may be sensor measurements or signal values captured by a sensor, may be generated or captured in response to occurrence of an event or a transaction, generated by a device such as in response to an interaction by a user with the device, etc. The data stored in dataset 124 may be captured at different date/time points periodically, intermittently, when an event occurs, etc. Each record of dataset 124 may include one or more date values and/or time values.

Dataset 124 may include data captured under normal and/or abnormal operating conditions of the physical object. Dataset 124 may include data captured at a high data rate such as 200 or more observations per second for one or more physical objects. For example, data stored in dataset 124 may be generated as part of the Internet of Things (IoT), where things (e.g., machines, devices, phones, sensors) can be connected to networks and the data from these things collected and processed within the things and/or external to the things before being stored in dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine (ESPE), which may reside in the cloud or in an edge device before being stored in dataset 124. For example, date updating application 122 may be implemented by the ESPE to merge chronologies and to employ ESPE to further dissect and analyze the streamed log data.

Dataset 124 may include, for example, a plurality of rows and a plurality of columns. The plurality of rows may be referred to as observation vectors or records, and the columns may be referred to as variables. In an alternative embodiment, dataset 124 may be transposed. The plurality of variables may define multiple dimensions for each observation vector. An observation vector $x_i$ may include a value for each of the plurality of variables associated with the observation i. Each variable of the plurality of variables may describe a characteristic of a physical object. For example, if dataset 124 includes data related to operation of a vehicle, the variables may include a date value, a time value, an oil pressure, a speed, a gear indicator, a gas tank level, a tire pressure for each tire, an engine temperature, a radiator level, etc. As another example, if dataset 124 includes data related to operation of a server computer, the variables may include a date value, a time value, a memory address, a computer identifier, a user identifier, a command identifier, an event indicator, one or more event parameters based on the event indicator, etc. Dataset 124 may include data captured as a function of time for one or more physical objects such as a plurality of vehicles or a plurality of server computers.

Dataset 124 may be stored as a plurality of records in the form $(x, Y)=(x_1, x_2, \ldots, x_k, Y)$, where variable, Y, is a target variable for which a model may be created by data analytic application 128. The vector x is composed of input variables, $x_1, x_2, \ldots, x_k$, that are used to model a determination of Y. The target variable Y can be any of the plurality of columns. Data analytic application 128 may use one or more of the input variables, $x_1, x_2, \ldots, x_k$, to generate an analytic model for data stored in dataset 124. Dataset 124 further may be stored as a plurality of records in the form $(x)=(x_1, x_2, \ldots, x_k)$, for which a model may be created by data analytic application 128 using unsupervised data. Dataset 124 still further may be stored with variable length records that vary based on a message type.

Dataset 124 may be stored using various structures as known to those skilled in the art including one or more files of a file system, a relational database, one or more tables of a system of tables, a structured query language database, etc. on date updating device 100 or on distributed computing system 130. Date updating device 100 may coordinate access to dataset 124 that is distributed across a plurality of computing devices. For example, dataset 124 may be stored in a cube distributed across a grid of computers as understood by a person of skill in the art. As another example, dataset 124 may be stored in a multi-node Hadoop® cluster. For instance, Apache™ Hadoop® is an open-source software framework for distributed computing supported by the Apache Software Foundation. As another example, dataset 124 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in dataset 124. The SAS® Viya™ open, cloud-ready, in-memory architecture developed and provided by SAS Institute Inc. of Cary, N.C. also may be used as an analytic platform to enable multiple users to concurrently access data stored in dataset 124. Some systems may use SAS In-Memory Statistics for Hadoop® developed and provided by SAS Institute Inc. of Cary, N.C. to read big data once and analyze it several times by persisting it in-memory for the entire session. Some systems may be of other types and configurations.

Figure 2A:
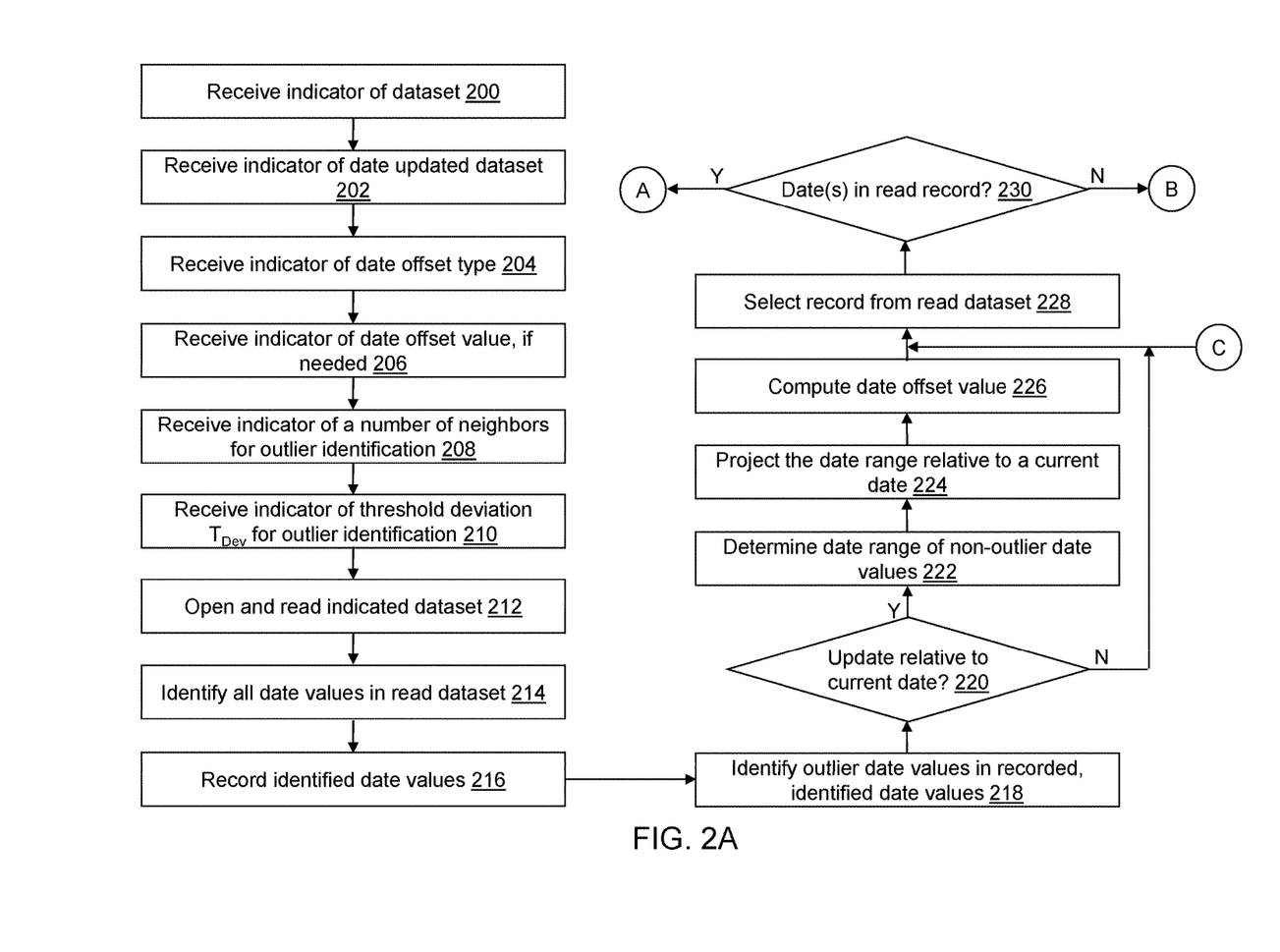
FIGS. 2A, 2B, and 2C depict a flow diagram illustrating examples of operations performed by the date updating device of FIG. 1 in accordance with an illustrative embodiment.
Figure 2B:
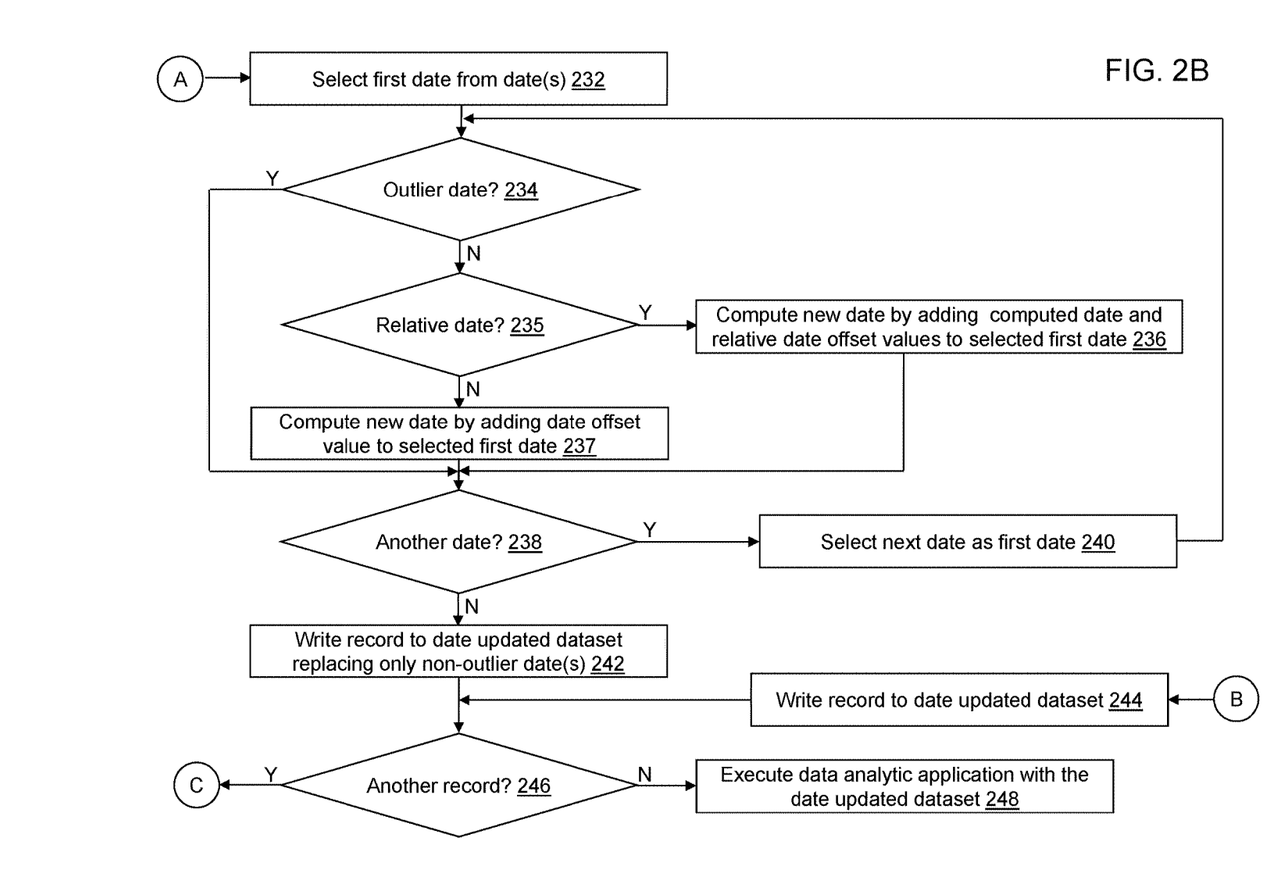
Figure 2C:
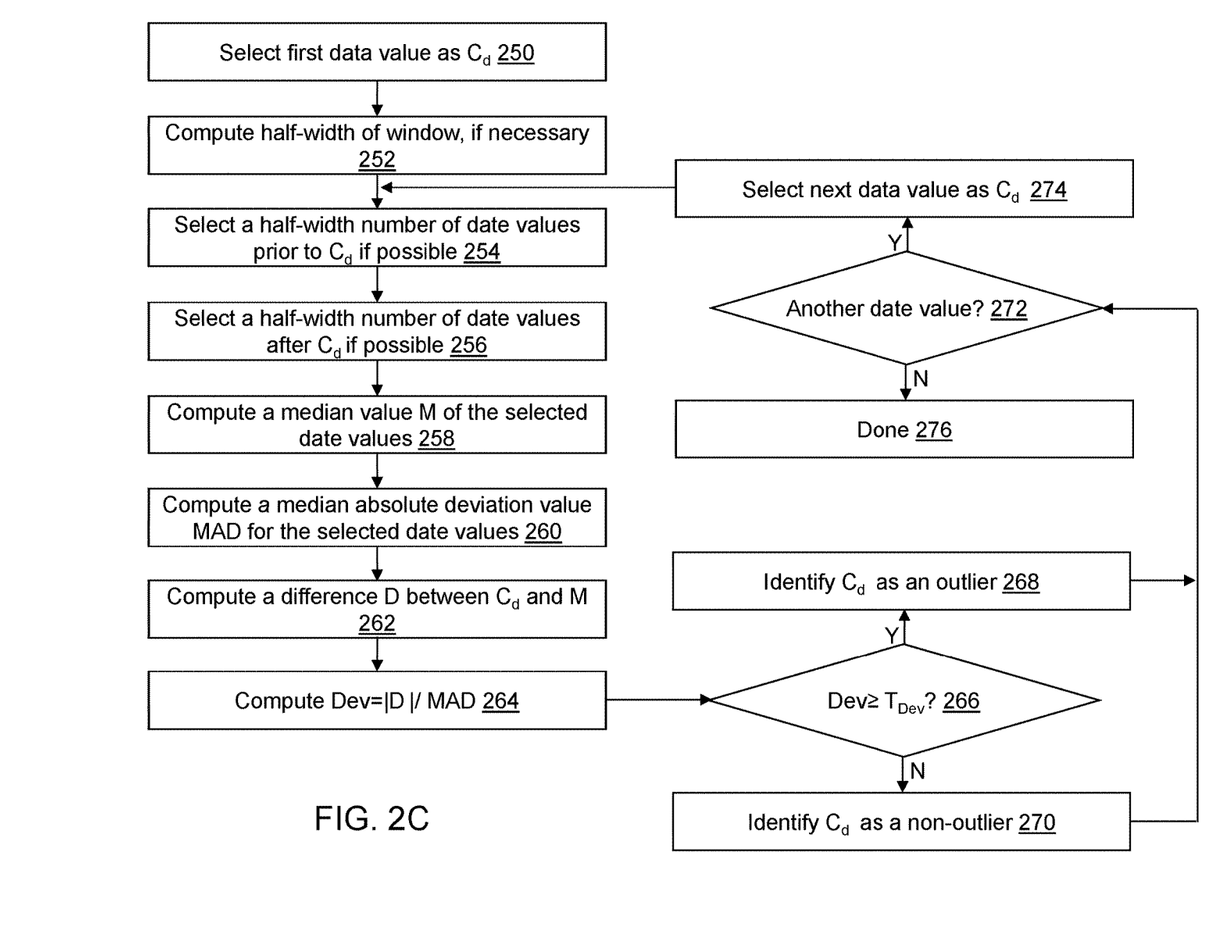

Referring to FIGS. 2A, 2B, and 2C, example operations associated with date updating application 122 are described. The example operations are described with reference to a date though the date may include a time value and the date may be replaced with a time value. For example, date updating application 122 may be used to create date updated dataset 126 from dataset 124. Date updating application 122 supports repeatable reporting, monitoring, and analysis by allowing developers to save dataset 124 generated over some period of use and to reprocess the content of dataset 124 to mimic current activity. This capability provides customers and/or developers with the ability to verify that the behavior of new or updated software is correct for a given set of inputs.

The reprocessing involves scanning records of dataset 124 for date and time information and adding a user-specified offset to those existing values. For the majority of content, this is the correct action. In some cases, however, the date content should not be modified, such as in the case of messages containing a copyright notification. Date updating application 122 avoids an update of these types of dates by applying a Hampel outlier filter to identify these types of dates as outliers and by not updating a date associated with an identified outlier. Date updating application 122 can maintain date reference frameworks, such as advancing dates to a new month, but maintaining matching days-of-the-week (Friday maps to the equivalent Friday, etc.), which is important when system activity is correlated with the weekday or work-shift.

Additional, fewer, or different operations may be performed depending on the embodiment of date updating application 122. The order of presentation of the operations of FIGS. 2A, 2B, and 2C is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute date updating application 122, which causes presentation of a first user interface window, which may include a plurality of menus and selectors such as drop down menus, buttons, text boxes, hyperlinks, etc. associated with date updating application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by date updating application 122.

Referring to FIG. 2A, in an operation 200, a first indicator may be received that indicates dataset 124. For example, the first indicator indicates a location and a name of dataset 124. As an example, the first indicator may be received by date updating application 122 after selection from a user interface window or after entry by a user into a user interface window. In an alternative embodiment, dataset 124 may not be selectable. For example, a most recently created dataset may be used automatically. The first indicator may indicate a plurality of datasets 124.

In an operation 202, a second indicator may be received that indicates date updated dataset 126. For example, the second indicator indicates a location and a name of date updated dataset 126. As an example, the second indicator may be received by date updating application 122 after selection from a user interface window or after entry by a user into a user interface window. In an alternative embodiment, date updated dataset 126 may not be selectable. For example, a default location and name may be stored and used for date updated dataset 126.

In an operation 204, a third indicator of a date offset type may be received. For example, the third indicator indicates a name of a date offset type. The third indicator may be received by date updating application 122 after selection from a user interface window or after entry by a user into a user interface window. A default value for the date offset type may further be stored, for example, in computer-readable medium 108. As an example, a date offset type may be selected from "Explicit Date Offset", "Explicit Relative Offset", "Update Backward Relative to Current Date", "Update Forward Relative Current Date", etc. Of course, the date offset type may be labeled or selected in a variety of different manners by the user, for example, using check boxes. In an alternative embodiment, the date offset type may not be selectable, and a single date offset type is implemented in date updating application 122. For example, the "Update Backward Relative to Current Date" may be used by default or without allowing a selection.

In an operation 206, a fourth indicator may be received that indicates a date offset value, if needed. For example, if "Explicit Date Offset" is indicated in operation 204 as the date offset type, an indication of the date offset value to be explicitly applied is received. As another example, if "Explicit Relative Offset" is indicated in operation 204 as the date offset type, an indication of a relative date offset value to be explicitly applied is received.

In an operation 208, a fifth indicator of a number of neighbors for outlier identification may be received. The number of neighbors defines a number of neighboring date values relative to a respective date value to use as part of the outlier identification. The number of neighbors may define a window width to apply before and after the date value being evaluated as an outlier. The number of neighbors may indicate a full-width or a half-width of the window. In an alternative embodiment, the fifth indicator may not be received. For example, a default value for the number of neighbors may be stored, for example, in computer-readable medium 108 and used automatically. In another alternative embodiment, the number of neighbors may not be selectable. Instead, a fixed, predefined value may be used.

In an operation 210, a sixth indicator of a value of a threshold deviation $T_{Dev}$ for outlier identification may be received. In an alternative embodiment, the sixth indicator may not be received. For example, a default value may be stored, for example, in computer-readable medium 108 and used automatically. In another alternative embodiment, the value of the threshold deviation $T_{Dev}$ may not be selectable. Instead, a fixed, predefined value may be used.

In an operation 212, dataset 124 is opened and read. When dataset 124 includes a plurality of datasets, all of the datasets may be opened and read so that the plurality of datasets is processed as a single dataset. As another option, when dataset 124 includes a plurality of datasets, each dataset of the plurality of datasets may be opened, read, and processed separately. For example, dataset 124 (or the plurality of datasets) may be read from a ROM type computer-readable medium to a RAM type computer-readable medium or other "in-memory" location.

In an operation 214, all date values are identified in the read dataset 124. For example, one or more sequential records or fields from the read dataset are compared to a plurality of predefined patterns for dates. A pattern match is identified as a date value. Each record may include one or more date values. For illustration, Table I below includes the Java language's date and time formatting patterns:

TABLE I

| Pattern | Example/Description |
| --- | --- |
| 0000000000 | seconds since Jan. 1, 1970 |
| 0000000000000 | milliseconds since Jan. 1, 1970 |
| 0000000000.000000 | seconds + microseconds since Jan. 1, 1970 |
| yyyy-MM-dd'T'HH:mm:ss | 2016-07-06T13:01:55 |
| yyyy-MM-dd HH:mm:ss | 2016-07-06 13:01:55 |
| yyyyMMdd'T'HHmmss | 20160706T130155 |
| yyyyMMdd:HH.mm.ss | 20160706:13.01.55 |
| yyyy/MM/dd HH:mm:ss | 2016/07/06 13:01:55 |
| HH:mm EEEE, MMMM dd, yyyy | 13:01 Wednesday, July 06, 2016 |
| MM/dd/yyyy hh:mm:ss aa | 07/06/2016 01:01:55 PM |
| dd/MMM/yyyy:HH:mm:ss | 06/Jul/2016:13.01.55 |
| EEE MMM dd HH:mm:ss yyyy | Wed Jul 06 13:01:55 2016 |
| MMM dd, yyyy h:mm:ss aa | Jul 06, 2016 1:01:55 PM |
| EEE MMM dd HH:mm:ss zzz yyyy | Wed Jul 06 13:01:55 EDT 2016 |
| MMMM dd, yyyy hh:mm:ss aa zzz | July 06, 2016 01:01:55 PM EDT |

In an operation 216, the identified date values are recorded. For example, the identified date values may be recorded to a temporary dataset that is stored in either a ROM type computer-readable medium, a RAM type computer-readable medium or other "in-memory" location, etc.

In an operation 218, outlier date values are identified in the recorded identified date values. For example, a Hampel filter is applied using the number of neighbors and the threshold deviation to identify outlier date values as described referring to FIG. 2C. For illustration, use of a Hampel filter is described in Ben-Gal I., *Outlier detection*, In: Maimon O. and Rockach L. (Eds.) Data Mining and Knowledge Discovery Handbook: A Complete Guide for Practitioners and Researchers," Kluwer Academic Publishers, 2005; in Kornel Chromiński and Magdalena Tkacz, *Comparison Of Outlier Detection Methods in Biomedical Data*, Journal Of Medical Informatics & Technologies, Vol. 16, 2010; and in hampel, printed from http://www.mathworks.com/help/signal/ref/hampel.html?requestedDomain=www.mathworks.com&requestedDomain=www.mathworks.com on Jul. 12, 2016, The MathWorks, Inc.

In an operation 250, a first date value is selected from the recorded identified date values as $D_v$.

In an operation 252, a half-width of a sample window may be computed, if necessary. For example, when the number of neighbors defines a half-width, no computation is needed and the half-width is the value of the number of neighbors indicated in operation 208. When the number of neighbors defines a full-width, the half-width may be computed by dividing the number of neighbors by two. If the number of neighbors input as a full-width is an odd number, the half-width may be rounded up or down by default.

In an operation 254, a half-width number of date values just before $D_v$ are selected from the recorded identified dates. In an operation 256, a half-width number of date values just after $D_v$ are selected from the recorded identified dates.

When $D_v$ is less than the half-width number of date values from the first date value, the half-width number of date values just before $D_v$ cannot be selected. In this case, the remainder that cannot be selected before $D_v$ is instead selected after $D_v$ so that the number of neighbors is selected relative to $D_v$ even when the sample window is not centered around $D_v$.

When $D_v$ is less than the half-width number of date values from the last date value, the half-width number of date values just after $D_v$ cannot be selected. In this case, the remainder that cannot be selected after $D_v$ is instead selected before $D_v$ so that the number of neighbors is selected relative to $D_v$ even when the sample window is not centered around $D_v$.

In an operation 258, a median value M is computed for the date values selected around $D_v$. In an operation 260, a median absolute deviation value MAD is computed for the date values selected around $D_v$ using the median value M.

In an operation 262, a difference Δ between $D_v$ and M is computed as $\Delta = D_v - M$.

In an operation 264, a deviation Dev of $D_v$ is computed as Dev=|Δ|/MAD.

In an operation 266, the computed deviation Dev is compared to the threshold deviation $T_{Dev}$ indicated in operation 210. For example, a determination is made concerning whether or not Dev≥$T_{Dev}$. When Dev≥$T_{Dev}$, processing continues in an operation 268. When Dev<$T_{Dev}$, processing continues in an operation 270.

In operation 268, $D_v$ is identified as an outlier date value in the recorded identified date values, and processing continues in an operation 272. In operation 270, $D_v$ is identified as a non-outlier date value in the recorded identified date values, and processing continues in operation 272. Of course, each of the date values in the recorded identified date values may be identified as a non-outlier by default so that the status as a non-outlier is changed in operation 268 to outlier, and operation 270 is not explicitly performed, or each of the date values in the recorded identified date values may be identified as an outlier by default so that the status as an outlier is changed in operation 270 to non-outlier, and operation 268 is not explicitly performed.

In operation 272, a determination is made concerning whether or not there is another recorded identified date value. When there is another recorded identified date value, processing continues in an operation 274. When there is not another recorded identified date value, processing continues in an operation 276.

In operation 274, a next date value is selected from the recorded identified date values as $D_v$, and processing continues in operation 254 to determine if the next date value is an outlier or a non-outlier. In operation 276, processing to identify outliers is done, and processing continues in an operation 220.

Referring again to FIG. 2A, in operation 220, a determination is made concerning whether or not the date offset type indicated in operation 204 is relative to the current date or is an explicit date offset type. When the date offset type is relative to the current date, processing continues in an operation 222. When the date offset type is not relative to the current date, processing continues in an operation 228.

In operation 222, a date range of the non-outlier dates is determined including a determination of a day of the week of at least one day of the date range (i.e., the day of the week of the first day of the date range or the day of the week of the last day of the date range). For example, if the date range is determined as Feb. 22-26, 2016, by reading the recorded identified date values for non-outlier dates, the day range is determined as Monday-Friday using a calendar function as understood by a person of skill in the art. The first day of the range as Monday may be identified, and/or the last day of the range as Friday may be identified, for example.

In an operation 224, the date range is projected relative to the current date, for example, based on a more explicit evaluation of the date offset type that may indicate that the projection is forward from the current date (next day of the week after the current date) or backward from the current date (previous day of the week before the current date). For example, if the date offset type indicates a backward projection of the date range relative to a current date of May 29, 2016, the projected date range is May 23-27, 2016, which also corresponds to the day range of Monday-Friday. If the date offset type indicates a forward projection of the date range relative to a current date of May 29, 2016, the projected date range is May 30-Jun. 3, 2016, which also corresponds to the day range of Monday-Friday, but forward relative to the current date. Of course, the current date may already fall on the indicated day.

In an operation 226, a date offset value is computed between a matching day of the projected date range and the date range of the non-outlier dates. The date offset value is the number of days between the date ranges. The date offset value may be computed between the first days of the ranges, the last days of the ranges, etc. For example, for a backward projection, the date offset value is computed as 91 days between May 23, 2016 and Feb. 22, 2016. For a forward projection, the date offset value is computed as 98 days between May 30, 2016 and Feb. 22, 2016.

In an operation 228, a record is selected from the read dataset. For example, a first record is selected on a first iteration of operation 228; a second record is selected on a second iteration of operation 228; etc.

In an operation 230, a determination is made concerning whether or not the record includes one or more dates. For example, the read record may be evaluated to determine if it includes a date in the recorded identified date values. When the record includes one or more dates, processing continues in an operation 232. When the record does not include one or more dates, processing continues in an operation 244.

Referring to FIG. 2B, in operation 232, a first date of the one or more dates is selected from the read record.

In an operation 234, a determination is made concerning whether or not the first date is an outlier date. For example, the first date is compared to the recorded identified date values to see if the matching date was identified as an outlier date in operation 218. When the first date is an outlier date, processing continues in an operation 238. When the first date is not an outlier date, processing continues in an operation 235.

In an operation 235, a determination is made concerning whether or not the date offset type indicated in operation 204 is an explicit relative offset. When the date offset type indicated is an explicit relative offset, processing continues in an operation 236. When the date offset type indicated is not an explicit relative offset, processing continues in an operation 237.

In operation 236, a new date is computed by adding the date offset value computed in operation 226 and the relative date offset value indicated in operation 206 to the selected first date. Processing continues in operation 238.

In operation 237, a new date is computed by adding the date offset value in operation 226 or the date offset value indicated in operation 206 to the selected first date.

In operation 238, a determination is made concerning whether or not the one or more dates include another date. When the one or more dates include another date, processing continues in an operation 240. When the one or more dates do not include another date, processing continues in an operation 242.

In operation 240, a next date of the one or more dates is selected from the read record as the first date, and processing continues in operation 234 to update the next date if it is a non-outlier date.

In operation 242, an updated record is written to the date updated dataset 126 replacing only the non-outlier dates in the read record as computed in operation 236. Of course, if all of the one or more dates included in the read record were identified as outlier date values, the record written is actually not updated and is instead written to the date updated dataset 126 as read in operation 228.

In operation 244, the read record is written to the date updated dataset 126 as read in operation 228.

In operation 246, a determination is made concerning whether or not the read dataset includes another record. When the read dataset includes another record, processing continues in operation 228 to process the next record for potential date replacement. When the read dataset does not include another record, processing continues in an operation 248.

In operation 248, data analytic application 128 is executed with date updated dataset 126 as an input to generate analytic results.

Figure 3:
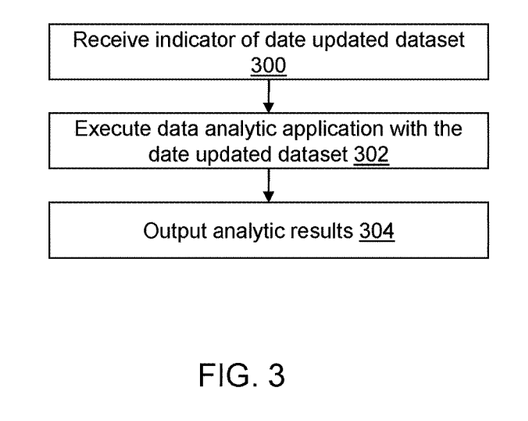
FIG. 3 depicts a flow diagram illustrating additional examples of operations performed by the date updating device of FIG. 1 in accordance with an illustrative embodiment.

Referring to FIG. 3, additional example operations associated with date updating application 122 are described. Additional, fewer, or different operations may be performed depending on the embodiment of date updating application 122. The operations further may be implemented by data analytic application 128 or integrated in another application that utilizes date updating application 122 and/or data analytic application 128. The order of presentation of the operations of FIG. 3 is not intended to be limiting. Although some of the operational flows are presented in sequence, the various operations may be performed in various repetitions, concurrently (in parallel, for example, using threads and/or a distributed computing system), and/or in other orders than those that are illustrated.

Similar to operation 202, in an operation 300, a seventh indicator may be received that indicates date updated dataset 126. In an alternative embodiment, date updated dataset 126 may not be selectable. For example, a most recently created date updated dataset may be used automatically. The first indicator may indicate a plurality of date updated datasets 126.

Similar to operation 248, in an operation 302, data analytic application 128 is executed with date updated dataset 126 to generate analytic results.

Figure 4:
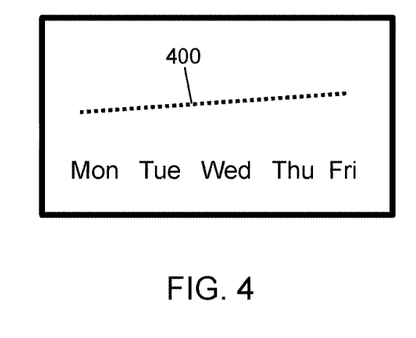
FIG. 4 depicts results using the date updating device of FIG. 1 in accordance with an illustrative embodiment.

In an operation 304, generated analytic results are output. For example, the analytic results may be stored on date updating device 100 and/or on one or more devices of distributed computing system 130 in a variety of formats as understood by a person of skill in the art. The analytic results further may be output to a display such as display 116, to a printer such as printer 120, to a speaker such as speaker 118, etc. For example, an alert message may be sent to another device using communication interface 106, printed on printer 120 or another printer, presented visually on display 116 or another display, presented audibly using speaker 118 or another speaker dependent on the type of analytic results which may be dependent on dataset 124. For example, referring to FIG. 4, a first analytic result curve 400 generated by data analytic application 128 using date updated dataset 126 is shown.

Figure 5:
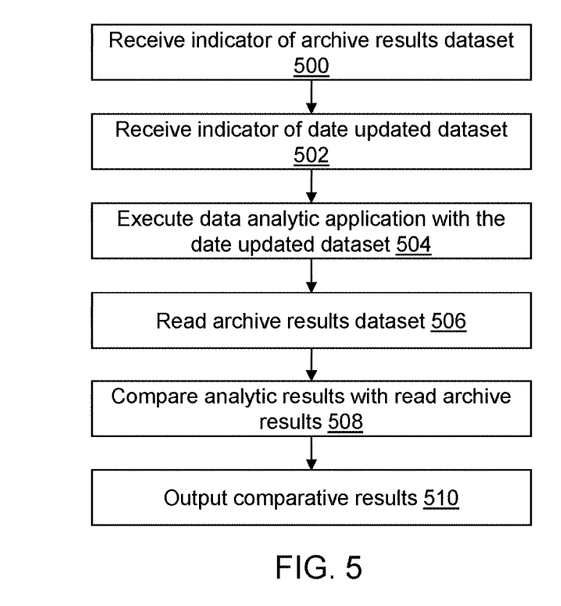
FIG. 5 depicts a flow diagram illustrating additional examples of operations performed by the date updating device of FIG. 1 in accordance with an illustrative embodiment.

Referring to FIG. 5, additional example operations associated with date updating application 122 are described. Additional, fewer, or different operations may be performed depending on the embodiment of date updating application 122. The operations further may be implemented by data analytic application 128 or integrated in another application that utilizes date updating application 122 and/or data analytic application 128. The order of presentation of the operations of FIG. 5 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 500, an eighth indicator may be received that indicates an archived results dataset. For example, the eighth indicator indicates a location and a name of the archived results dataset. As an example, the eighth indicator may be received by date updating application 122 after selection from a user interface window or after entry by a user into a user interface window.

Similar to operation 300, in an operation 502, a ninth indicator may be received that indicates date updated dataset 126. Similar to operation 248, in an operation 504, data analytic application 128 is executed with date updated dataset 126 to generate analytic results.

In an operation 506, the archived results dataset is read. For example, the archived results dataset may be read from a ROM type computer-readable medium to a RAM type computer-readable medium or other "in-memory" location.

In an operation 508, the read archived results dataset is compared to the generated analytic results.

Figure 6:
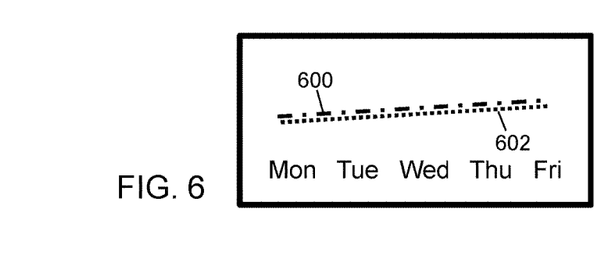
FIG. 6 depicts comparative results using the date updating device of FIG. 1 in accordance with an illustrative embodiment.

In an operation 510, comparative results and/or the analytic results are output. For example, the comparative results and/or the analytic results may be stored on date updating device 100 and/or on one or more devices of distributed computing system 130 in a variety of formats as understood by a person of skill in the art. The comparative results and/or the analytic results further may be output to a display such as display 116, to a printer such as printer 120, to a speaker such as speaker 118, etc. For example, an alert message may be sent to another device using communication interface 106, printed on printer 120 or another printer, presented visually on display 116 or another display, presented audibly using speaker 118 or another speaker dependent on the type of comparative results and/or the analytic results. For example, referring to FIG. 6, a second analytic result curve 600 generated by data analytic application 128 using date updated dataset 126 and a third analytic result curve 602 generated from the read archived results dataset are shown as comparative results.

Figure 7:
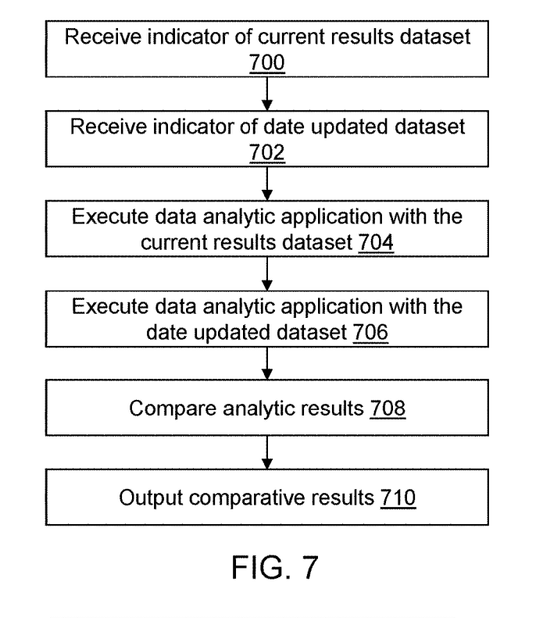
FIG. 7 depicts a flow diagram illustrating additional examples of operations performed by the date updating device of FIG. 1 in accordance with an illustrative embodiment.

Referring to FIG. 7, additional example operations associated with date updating application 122 are described. Additional, fewer, or different operations may be performed depending on the embodiment of date updating application 122. The operations further may be implemented by data analytic application 128 or integrated in another application that utilizes date updating application 122 and/or data analytic application 128. The order of presentation of the operations of FIG. 7 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 700, a tenth indicator may be received that indicates a current results dataset. For example, the tenth indicator indicates a location and a name of the current results dataset. As an example, the tenth indicator may be received by date updating application 122 after selection from a user interface window or after entry by a user into a user interface window.

Similar to operation 300, in an operation 702, an eleventh indicator may be received that indicates date updated dataset 126.

Similar to operation 248, in an operation 704, data analytic application 128 is executed with the current results dataset to generate current analytic results.

Similar to operation 248, in an operation 706, data analytic application 128 is executed with date updated dataset 126 to generate analytic results.

In an operation 708, the generated current analytic results are compared to the generated analytic results.

Figure 8:
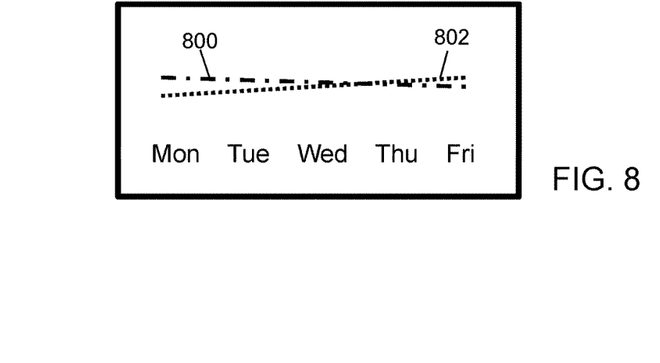
FIG. 8 depicts second comparative results using the date updating device of FIG. 1 in accordance with an illustrative embodiment.

In an operation 710, comparative results and/or the analytic results are output. For example, the comparative results and/or the analytic results may be stored on date updating device 100 and/or on one or more devices of distributed computing system 130 in a variety of formats as understood by a person of skill in the art. The comparative results and/or the analytic results further may be output to a display such as display 116, to a printer such as printer 120, to a speaker such as speaker 118, etc. For example, an alert message may be sent to another device using communication interface 106, printed on printer 120 or another printer, presented visually on display 116 or another display, presented audibly using speaker 118 or another speaker dependent on the type of comparative results and/or analytic results. For example, referring to FIG. 8, a fourth analytic result curve 800 generated by data analytic application 128 using date updated dataset 126 and a fifth analytic result curve 802 generated using the current results dataset are shown as comparative results.

Figure 9:
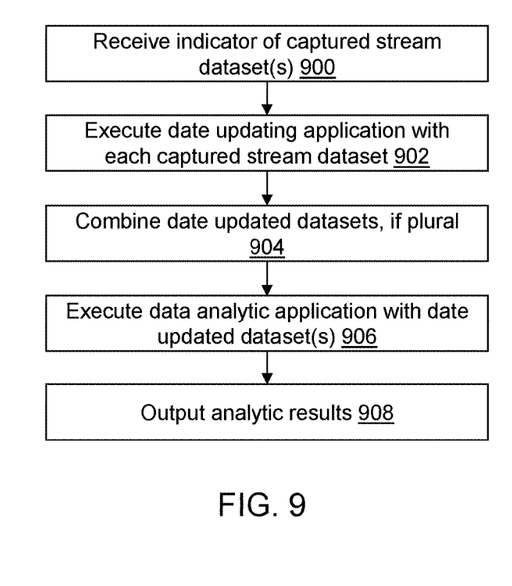
FIG. 9 depicts a flow diagram illustrating additional examples of operations performed by the date updating device of FIG. 1 in accordance with an illustrative embodiment.

Referring to FIG. 9, additional example operations associated with date updating application 122 are described. Additional, fewer, or different operations may be performed depending on the embodiment of date updating application 122. The operations further may be implemented by data analytic application 128 or integrated in another application that utilizes date updating application 122 and/or data analytic application 128. The order of presentation of the operations of FIG. 9 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 900, a twelfth indicator may be received that indicates one or more captured stream datasets. For example, the twelfth indicator indicates a location and a name of the one or more captured stream datasets. As an example, the twelfth indicator may be received by date updating application 122 after selection from a user interface window or after entry by a user into a user interface window.

In an operation 902, date updating application 122 is executed separately with each of the one or more captured stream datasets to generate date updated dataset 126 for each of the one or more captured stream datasets.

In an operation 904, the date updated dataset 126 for each of the one or more captured stream datasets are combined into a single date updated dataset 126 if the one or more captured stream datasets include a plurality of captured stream datasets.

Similar to operation 248, in an operation 906, data analytic application 128 is executed with the single date updated dataset 126 to generate current analytic results.

Similar to operation 304, in an operation 908, the generated current analytic results are output.

Figure 10:
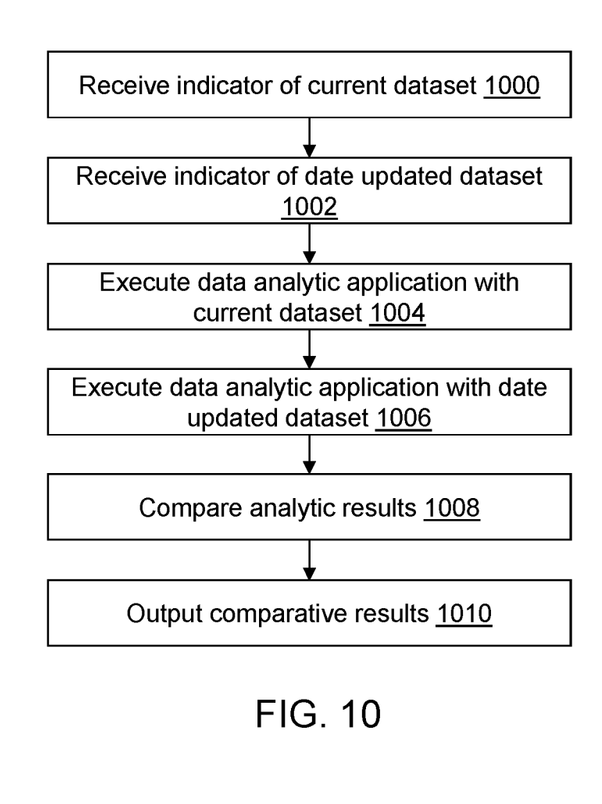
FIG. 10 depicts a flow diagram illustrating additional examples of operations performed by the date updating device of FIG. 1 in accordance with an illustrative embodiment.

Referring to FIG. 10, additional example operations associated with date updating application 122 are described. Additional, fewer, or different operations may be performed depending on the embodiment of date updating application 122. The operations further may be implemented by data analytic application 128 or integrated in another application that utilizes date updating application 122 and/or data analytic application 128. The order of presentation of the operations of FIG. 10 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1000, a thirteenth indicator may be received that indicates a current dataset. For example, the thirteenth indicator indicates a location and a name of the current dataset. As an example, the tenth indicator may be received by date updating application 122 after selection from a user interface window or after entry by a user into a user interface window. The thirteenth indicator may indicate a plurality of current datasets.

Similar to operation 300, in an operation 1002, a fourteenth indicator may be received that indicates date updated dataset 126.

Similar to operation 248, in an operation 1004, data analytic application 128 is executed with the current dataset to generate current analytic results for each current dataset.

Similar to operation 248, in an operation 1006, data analytic application 128 is executed with date updated dataset 126 to generate analytic results.

Similar to operation 708, in an operation 1008, the generated current analytic results are compared to the generated analytic results.

Figure 11:
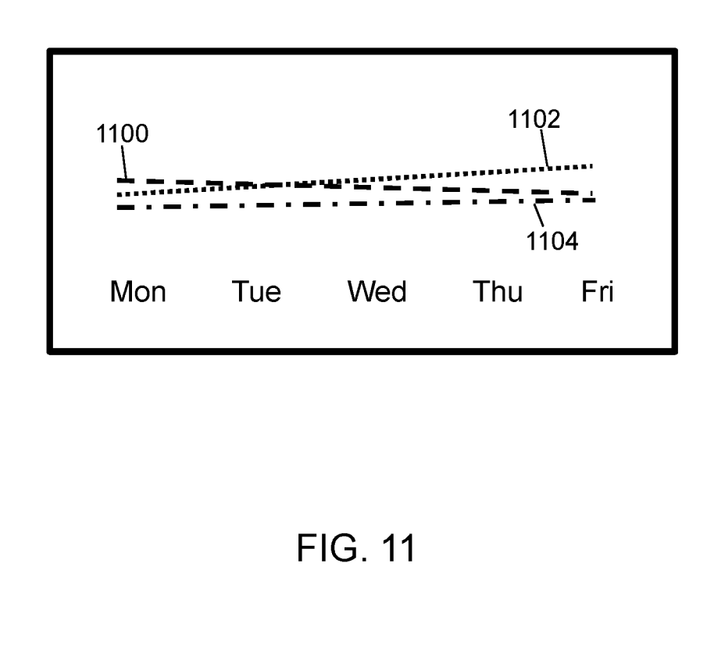
FIG. 11 depicts third comparative results using the date updating device of FIG. 1 in accordance with an illustrative embodiment.

Similar to operation 710, in an operation 1010, comparative results and/or the analytic results are output. For example, referring to FIG. 11, a sixth analytic result curve 1100 generated by data analytic application 128 using date updated dataset 126, a seventh analytic result curve 1102 generated using a first current dataset, and an eighth analytic result curve 1104 generated using a second current dataset are shown as comparative results.

Though date updating application 122 has been described to update a date to a current date, date updating application 122 can be configured to update date updated dataset 126 to any date requested by a user. The current date is replaced with a predefined date indicated by the user as part of input processing. Date updated dataset 126 can be used to demonstrate analytic results projected forward or backward in time relative to the date(s) during which dataset 124 was created.

Date updated dataset 126 also can be used to align one or more datasets in time with one or more other datasets as needed. The date aligned datasets can be used for benchmark testing, for date independent testing, for dataset merging in time, for anonymizing dataset 124, for synchronizing datasets, etc.

Benchmark testing is used to capture a first log stream for a 'baseline' system. The system is reconfigured. A second log stream is captured with the reconfigured system. Date updating application 122 may be configured to update the captured first log stream to the date the second log stream was captured or vice versa so that the logged measures from both configurations can be compared.

Date independent testing is used in testing that expects relatively dated (i.e. 'last week') log records. Date updating application 122 may be configured to recreate identical log data streams for regression testing.

Dataset merging in time is used to build large volumes of concurrent log records to drive heavier loads for performance testing of log processing. Date updating application 122 may be configured to merge the log records in time.

Anonymizing dataset 124 is used in health records for patients so that the records cannot be correlated to individuals even when the patient identifier is removed using public sources of personal information such accident and criminal records, county property records, obituaries, etc. Date updating application 122 may be configured to change a date of the health records.

Synchronizing datasets is used by companies or data centers that are combining, merging representative usage log streams into a common stream to simulate how combining the entities may impact computing resources. Reporting and monitoring tools read and process dynamic, real-time data issued by computer systems that have varying usage patterns and load demands. Synchronizing datasets allows script actions to "replay" complex interactions between the various systems. Date updating application 122 may be configured to synchronize the log streams.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset;

identify date values in the read dataset;

identify outlier and non-outlier date values included in the identified date values by, for each date value of the identified date values as a respective date value,         reading a predefined number of neighboring date values relative to the respective date value;

computing a median value and a median absolute deviation value of the read predefined number of neighboring date values;
computing a difference between the respective date value and the computed median value;
dividing an absolute value of the computed difference by the computed median absolute deviation value to define a deviation value of the respective date value;
comparing the defined deviation value to a threshold deviation value; and
based on the comparison, identifying the respective date value as either an outlier date value or a non-outlier date value;
determine a date offset value;
update each identified non-outlier date value read from the dataset with a new date computed using the determined date offset value; and
store the read dataset to a date updated dataset by replacing each identified non-outlier date value with a corresponding updated date value.

2. The non-transitory computer-readable medium of claim 1, wherein, before determining the date offset value, the computer-readable instructions further cause the computing device to receive an indicator of the date offset value through a user interface, and to store the date offset value indicated by the indicator to the non-transitory computer-readable medium.

3. The non-transitory computer-readable medium of claim 2, wherein the date offset value is determined by selecting the stored date offset value from the non-transitory computer-readable medium.

4. The non-transitory computer-readable medium of claim 1, wherein the date offset value is determined by:
determining a date range of the identified non-outlier date values;
projecting the determined date range relative to a predefined date; and
computing the date offset value based on a difference between the determined date range and the projected date range.

5. The non-transitory computer-readable medium of claim 4, wherein, after determining the date range and before projecting the determined date range, the computer-readable instructions further cause the computing device to identify a day of the week of a day of the determined date range.

6. The non-transitory computer-readable medium of claim 5, wherein projecting the determined date range comprises identifying a date of the identified day of the week that is prior to and closest to the predefined date.

7. The non-transitory computer-readable medium of claim 6, wherein the predefined date is a current date.

8. The non-transitory computer-readable medium of claim 6, wherein computing the date offset value comprises computing a number of days between the date of the identified day of the week and the day of the determined date range.

9. The non-transitory computer-readable medium of claim 8, wherein computing the date offset value further comprises adding a stored relative date offset value to the computed number of days.

10. The non-transitory computer-readable medium of claim 9, wherein the computer-readable instructions further cause the computing device to receive an indicator of the relative date offset value through a user interface and to store the relative date offset value indicated by the indicator to the non-transitory computer-readable medium.

11. The non-transitory computer-readable medium of claim 5, wherein projecting the determined date range comprises identifying a date of the identified day of the week that is after and closest to the predefined date.

12. The non-transitory computer-readable medium of claim 11, wherein the predefined date is a current date.

13. The non-transitory computer-readable medium of claim 11, wherein computing the date offset value comprises computing a number of days between the date of the identified day of the week and the day of the determined date range.

14. The non-transitory computer-readable medium of claim 13, wherein computing the date offset value further comprises adding a stored relative date offset value to the computed number of days.

15. The non-transitory computer-readable medium of claim 14, wherein the computer-readable instructions further cause the computing device to receive an indicator of the relative date offset value through a user interface and to store the relative date offset value indicated by the indicator to the non-transitory computer-readable medium.

16. The non-transitory computer-readable medium of claim 1, wherein the computer-readable instructions further cause the computing device to execute a data analytic application with data in the stored date updated dataset.

17. The non-transitory computer-readable medium of claim 1, wherein the date values are identified by comparing one or more sequential records from the read dataset to a plurality of predefined patterns for dates.

18. The non-transitory computer-readable medium of claim 1, wherein the respective date value is identified as an outlier date value when the defined deviation is greater than the threshold deviation.

19. The non-transitory computer-readable medium of claim 18, wherein the respective date value is identified as a non-outlier date value when the defined deviation is less than the threshold deviation.

20. A computing device comprising:
a processor; and
a non-transitory computer-readable medium operably coupled to the processor, the computer-readable medium having computer-readable instructions stored thereon that, when executed by the processor, cause the computing device to read a dataset;
identify date values in the read dataset;
identify outlier and non-outlier date values included in the identified date values by, for each date value of the identified date values as a respective date value,
reading a predefined number of neighboring date values relative to the respective date value;
computing a median value and a median absolute deviation value of the read predefined number of neighboring date values;
computing a difference between the respective date value and the computed median value;
dividing an absolute value of the computed difference by the computed median absolute deviation value to define a deviation value of the respective date value;
comparing the defined deviation value to a threshold deviation value; and
based on the comparison, identifying the respective date value as either an outlier date value or a non-outlier date value;
determine a date offset value;
update each identified non-outlier date value read from the dataset with a new date computed using the determined date offset value; and store the read dataset to a date updated dataset by replacing each identified non-outlier date value with a corresponding updated date value.

21. The computing device of claim 20, wherein the date offset value is determined by:
   determining a date range of the identified non-outlier date values;
   projecting the determined date range relative to a predefined date; and
   computing the date offset value based on a difference between the determined date range and the projected date range.

22. The computing device of claim 21, wherein, after determining the date range and before projecting the determined date range, the computer-readable instructions further cause the computing device to identify a day of the week of a day of the determined date range.

23. The computing device of claim 22, wherein projecting the determined date range comprises identifying a date of the identified day of the week that is prior to and closest to the predefined date.

24. The computing device of claim 23, wherein computing the date offset value comprises computing a number of days between the date of the identified day of the week and the day of the determined date range.

25. The computing device of claim 22, wherein projecting the determined date range comprises identifying a date of the identified day of the week that is after and closest to the predefined date.

26. A method of updating dataset dates in support of data analytics, the method comprising:
   reading a dataset by a computing device;
   identifying, by the computing device, date values in the read dataset;
   identifying, by the computing device, outlier and non-outlier date values included in the identified date values by, for each date value of the identified date values as a respective date value,
      reading a predefined number of neighboring date values relative to the respective date value;
      computing a median value and a median absolute deviation value of the read predefined number of neighboring date values;
      computing a difference between the respective date value and the computed median value;
      dividing an absolute value of the computed difference by the computed median absolute deviation value to define a deviation value of the respective date value;
      comparing the defined deviation value to a threshold deviation value; and
      based on the comparison, identifying the respective date value as either an outlier date value or a non-outlier date value;
   determining, by the computing device, a date offset value;
   updating, by the computing device, each identified non-outlier date value read from the dataset with a new date computed using the determined date offset value; and
   storing, by the computing device, the read dataset to a date updated dataset by replacing each identified non-outlier date value with a corresponding updated date value.

27. The method of claim 26, wherein the date offset value is determined by:
   determining a date range of the identified non-outlier date values;
   projecting the determined date range relative to a predefined date; and
   computing the date offset value based on a difference between the determined date range and the projected date range.

28. The method of claim 27, further comprising identifying a day of the week of a day of the determined date range after determining the date range and before projecting the determined date range.

29. The method of claim 28, wherein projecting the determined date range comprises identifying a date of the identified day of the week that is prior to and closest to the predefined date.

30. The method of claim 28, wherein projecting the determined date range comprises identifying a date of the identified day of the week that is after and closest to the predefined date.

* * * * *